March 24, 1959 W. D. NOVAK 2,878,873
OBJECT POSITIONING APPARATUS WITH ELECTRIC SENSING MEANS
Filed Sept. 17, 1953 4 Sheets-Sheet 1

Inventor:
Warren D. Novak,
by Julius C. Zaskalicky
His Attorney.

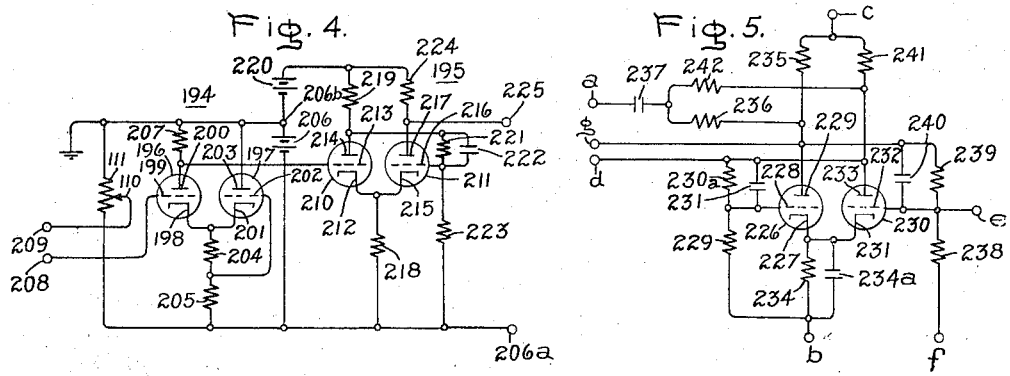
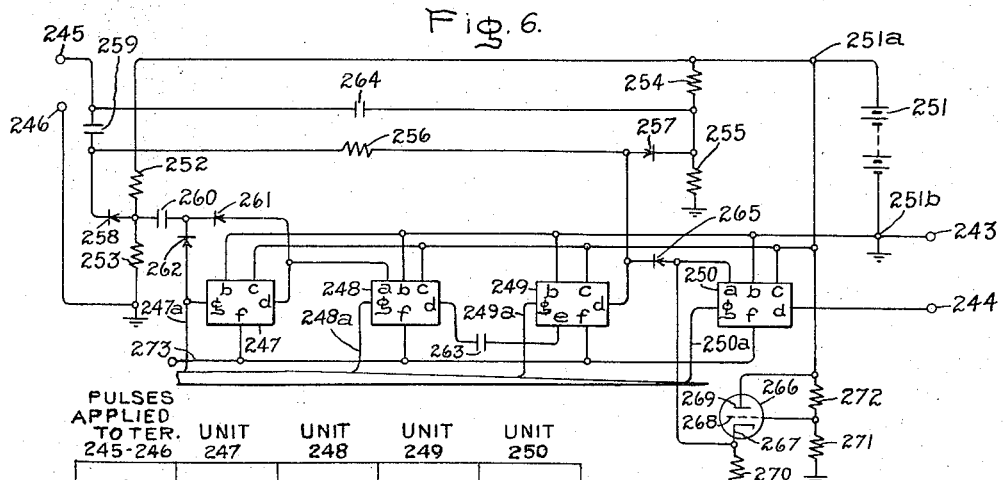

| PULSES APPLIED TO TER. 245-246 | UNIT 247 | UNIT 248 | UNIT 249 | UNIT 250 |
|---|---|---|---|---|
| 0 | DOWN | DOWN | DOWN | DOWN |
| 1 | UP | DOWN | DOWN | DOWN |
| 2 | DOWN | UP | DOWN | DOWN |
| 3 | UP | UP | DOWN | DOWN |
| 4 | DOWN | DOWN | UP | DOWN |
| 5 | DOWN | DOWN | DOWN | UP |
| 6 | UP | DOWN | DOWN | UP |
| 7 | DOWN | UP | DOWN | UP |
| 8 | UP | UP | DOWN | UP |
| 9 | DOWN | DOWN | UP | UP |

Fig. 7.

THE DESIGNATIONS IN THE BOXES INDICATE THE POTENTIAL STATE OF TERMINAL d OF THE UNITS AFTER THE NUMBER OF PULSES LISTED IN THE LEFT HAND COLUMN HAVE BEEN APPLIED AT TERMINALS 245-246

Inventor:
Warren D. Novak,
by Julius J. Zaskalicky
His Attorney.

March 24, 1959 W. D. NOVAK 2,878,873
OBJECT POSITIONING APPARATUS WITH ELECTRIC SENSING MEANS
Filed Sept. 17, 1953 4 Sheets-Sheet 4

Inventor:
Warren D. Novak,
by *Julius J. Zaskalicky*
His Attorney.

United States Patent Office 2,878,873
Patented Mar. 24, 1959

2,878,873

OBJECT POSITIONING APPARATUS WITH ELECTRIC SENSING MEANS

Warren D. Novak, Liverpool, N.Y., assignor to General Electric Company, a corporation of New York Application September 17, 1953, Serial No. 380,773

10 Claims. (Cl. 164—117)

The present invention relates to method and apparatus for positioning an object in a predetermined location and has as an object thereof to provide simple means for moving an object rapidly to a predetermined and precise location.

The invention has particular application in machine tool apparatus in connection with which it is necessary to position objects to be worked on in order that various desired operations may be performed on these objects. Expedients usually used to position such objects to be worked are mechanical stops and various screw arrangements. These expedients tend to make the positioning of the work pieces slow, cumbersome and involved.

Accordingly, the present invention is directed in its particular aspects to provide means for overcoming limitations of the character described in prior art techniques.

An important feature of the present invention is to provide improved hydraulic means for restraining and limiting with precision the motion of an object in any desired way.

Another object of the present invention is to provide improved means for sensing incrementally with high precision the displacement of an object.

Still another object of the present invention is to provide improved pneumatic and hydraulic means for positioning a moving object in a desired location.

It is also an object of the present invention to move an object automatically to various predetermined and precise locations where desired operations may be performed thereon.

A further object of the present invention is to provide hydraulic means to slow down the motion of an object and air collet clamping means to stop the object in a desired location.

A still further object of the present invention is to provide means for measuring digitally the position of an object with a high degree of precision and in a manner which is independent of wear, of speed, of motion, and of direction of motion of the object.

In carrying the present invention out as applied to apparatus for performing a number of operations, for example, punching operations on a workpiece, there is provided means for moving said workpiece to a desired location. Means are also provided for controlling the rate of movement of said workpiece. Additional means are provided for sensing the movement of said workpiece. Further means are provided responsive to said sensing means for actuating said workpiece control means to stop said work moving means at a predetermined location in order that a desired operation may be performed thereon. Still further means are provided for periodically presetting said means which actuates said workpiece control means and for activating said workpiece moving means in order to cause said workpiece to move to a different predetermined location where another operation may be performed thereon.

The novel features which I believe to be characteristic of my invention are set forth with particularity in the appended claims. My invention itself, however, both as to its organization and method of operation, together with further objects and advantages thereof may best be undersood by reference to the following description taken in connection with the accompanying drawings in which:

Fig. 4 is a schematic diagram of an amplifier and shaper circuit utilized in the apparatus of Fig. 1;

Fig. 5 is a schematic diagram of a basic unit of the predetermined counter of the apparatus of Fig. 1;

Fig. 6 is a schematic diagram of a decade of the predetermined counter of the apparatus of Fig. 1;

Fig. 7 is a table useful in explaining the operation of the circuit of Fig. 6;

Figure 1:
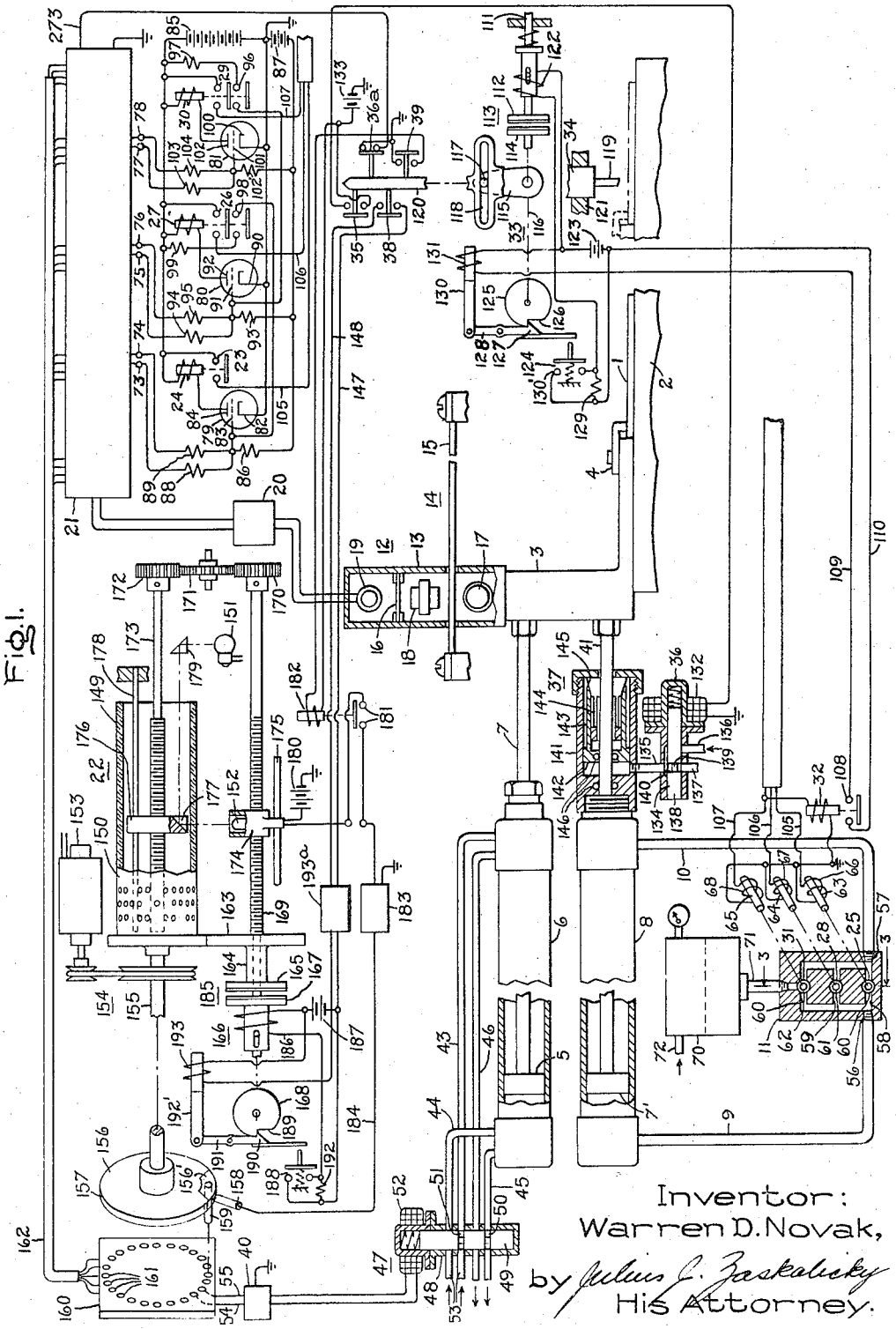
Fig. 1 is a diagram of apparatus for carrying out my invention.

Referring now to Fig. 1, there is shown apparatus in accordance with my invention for performing a number of operations, for example, punching operations on a workpiece 1. The workpiece 1 is fastened to a work holder 3 by a clamp 4. The work holder 3 is movable along the table 2 by means of the piston 5 of pneumatic cylinder 6 attached to the work holder by rod 7. Application of air under pressure to one side or the other side of the piston 5 causes the work holder 3 and hence the workpiece 1 to move in one direction or the other. Fastened directly to the work holder 3 is the piston 7' of a hydraulic cylinder 8 which controls the rate of the movement of the work holder 3 and hence controls the position of the work holder 3. This latter function is accomplished by bypass ducts 9 and 10 and valve assembly 11. Duct 9 connects one end of the cylinder 8 to one port of valve assembly 11 and duct 10 connects the other end of cylinder 8 to the other port of valve block assembly 11. The cylinder 8, the ducts 9 and 10 and the valve assembly 11 are completely filled with a substantially incompressible fluid. As the hydraulic piston 7' moves, the incompressible fluid is driven out of the cylinder 8 in front of the advancing piston through the ducts 9 and 10 and valve assembly 11 and back into the cylinder 8 behind the piston 7'. By actuation of the appropriate valve or valves of the valve assembly 11, the rate of movement and the position of the work holder 3 is controlled, for example, when all valves are closed the work holder cannot move because passage of the incompressible fluid from one side of the piston 7' to the other is blocked.

The distance the work holder 3 moves with respect to a predetermined location is measured out by a sensing device 12 which includes a portion 13 attached to the work holder 3 and another portion 14 which is attached to the work table 2. In the form shown the portion attached to the work table 2 is a long transparent scale or bar 15 on which are located fine opaque lines separated by transparent spaces of the same width as the opaque lines. The portion attached to the work holder 3 includes a short scale 16 of transparent material having fine opaque lines separated by transparent spaces of the same width as these lines. Light from a source 17 is directed through the transparent long scale 15 to an optical focusing means 18 and thence through the other transparent scale 16 to a phototube 19 or similar light responsive device. Thus, as the first portion 13 of the sensing device including the short scale 16 moves with respect to the second portion 14, pulses of light are received by the phototube 19 each time the work holder 3 moves a distance equal substantially to the distance from the edge of one opaque line to the corresponding edge of the next opaque line of the long scale.

The phototube 19 converts the impulses of light into electrical impulses which are then applied to a predetermined counter 21 through pulse amplifier and shaper 20. The predetermined counter 21 is preset by reader device 22 to cause the development of a series of switching actions corresponding to predetermined locations of the work holder 3. With the means shown, three such switching actions are developed. The first switching action is developed after a certain number of pulses have been applied to the predetermined counter 21. At this time contacts 23 of relay 24 are actuated and cause the valve 25 of valve assembly 11 to close, thereby slowing down the movement of the work holder 3. As additional impulses are applied to the predetermined counter 21 from the sensing device 12, contacts 26 of relay 27 are actuated and cause valve 28 of valve assembly 11 to close thereby further slowing down the motion of the work holder 3. As still additional pulses are received by the predetermined counter 21 from the sensing device 19, contacts 29 of relay 30 are actuated causing valve 31 of valve assembly 11 to close, thereby stopping the work holder 3 in the position desired. Substantially simultaneously with the closure of the valve 31, a relay 32 is energized which causes the punch mechanism 33 to be actuated to cause the punch holder 34 to start on its downward movement toward the workpiece 1.

During this movement the switch 35 is closed and actuates through an air valve 36 an air collet arrangement 37 which clamps the work holder 3 in the desired location. As the punch holder 34 moves down farther, the switch 36a is opened and sets the predetermined counter 21 to zero in order that another presetting operation may be performed thereon as will become readily apparent as this description proceeds. As the punch holder 34 moves still farther toward the workpiece 1, the switch 38 is closed and an impulse is supplied to the reader device 22 causing the latter to be readied to send out a series of presetting pulses to the predetermined counter 21. As the punch holder 34 moves still farther toward the workpiece 1 the switch 39 is actuated and connects the output of the reader device 22 to the predetermined counter 21, thereby permitting a presetting of this counter to a count corresponding to the next position to which it is desired to move the workpiece 1.

In addition to supplying the predetermined counter 21 with presetting information, the reader device 22 supplies a pulse to the selective device 40 to actuate or deactuate the solenoid of the air valve assembly 47 to cause the piston 5 of the air cylinder 6 to move the work holder in the desired direction after the air collet 37 has released the work holder 3. It will be observed that when the predetermined counter 21 is preset, simultaneously therewith, the valves 25, 28 and 31 are opened but that the work holder cannot move to a new location until the air collet 37 has released its grip on the shaft 41 connecting the piston 7' of the hydraulic cylinder to the work holder 3.

As the punch holder 34 returns to its original position, the switch 39 is opened, disconnecting the reader device 22 from the predetermined counter 21. The switch 35 is also opened and releases the air collet 37 thereby permitting the piston 5 of pneumatic cylinder 6 to cause the work holder 3 to move the workpiece 1 towards the next location in a direction determined by the direction to which the air valve arrangement 47 has been directed and to a distance which has been determined by the new count supplied to the predetermined counter 21 from the reader device 22.

Referring to Fig. 1 for a more detailed description of the components of the system therein shown, the means for moving the work holder 3 comprises a sealed cylinder 6 in which is located a piston 5, the piston being fastened to the work holder by the rod 7. To each end of the cylinder is connected a pair of ducts, one for the entry of air and the other for exhaust of the air. Ducts 43 and 44 are intake ducts and ducts 45 and 46 are exhaust ducts. Air flow through these ducts is controlled by a two-way valve 47 which comprises a housing 48 to which the intake and outgoing ducts are connected. Within the housing is located a cylindrical core 49 having peripheral notches 50 and 51 along the length thereof, as shown. The cylindrical core 49 is spring biased in one position and when the solenoid 52 is energized it is caused to move to another position. When the cylindrical core 49 is in said one position the ducts 44 and 46 are sealed off and air under pressure passes from the main 53 through the valve 47 to the duct 43 and causes the piston 5 to move toward the opposite end of the cylinder 6, thereby causing air to flow out of the cylinder 6 through duct 45 and valve 47. When the cylindrical core 49 is moved to the other position by energization of the solenoid 52, the ducts 43 and 45 are sealed off and now duct 44 is connected to an air pressure main 53 and duct 46 is opened to the outside, thereby causing the piston 5 to move in a direction away from the end to which the duct 44 is connected. The solenoid 52 is connected to directional switching device 40 which in turn is actuated by pulses from the reader device 22 supplied over conductors 54 and 55. A pulse supplied over one conductor causes the solenoid 52 to be energized and a pulse supplied over the other conductor causes the solenoid 52 to be deenergized, thereby causing the piston 5 to move in one direction or the other direction.

Figure 2:
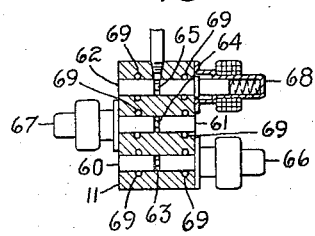
Fig. 2 is a sectional view of the hydraulic valve of the apparatus of Fig. 1.

The hydraulic control system for controlling the motion of the work holder 3 comprises an enclosed cylinder 8 including a piston 7' movable therein. The piston 7' is fastened to the work holder 3 by means of rod 41. The valve assembly 11 comprises a housing having a port 56 connected to duct 9, the other end of which is connected to one end of cylinder 8, and a port 57 connected to duct 10 the other end of which is connected to the other end of cylinder 8. Within the housing are three parallel paths 58, 59 and 60 between ports 56 and 57 for the flow of fluid therebetween. In each one of these parallel paths is located a cylindrical opening which is perpendicular to the direction of fluid flow through each of the paths. In each of these cylindrical openings are closely fitted respective cylindrical cores 60, 61, and 62 having peripheral grooves 63, 64, and 65 thereon as more fully shown in Fig. 2. Each of these cores 60, 61, and 62 may be moved in the respective cylindrical openings by respective solenoids 66, 67 and 68. Normally the groove on each of the cores is spring biased into registry with a corresponding path, and fluid flows therethrough. When a solenoid is actuated the respective cylindrical core is caused to move out of registry with the path, thereby blocking flow of fluid through that path. Seals 69 are located on each side of the grooves 63, 64, and 65 as shown in Fig. 2. These seals function to prevent leakage of hydraulic fluid along the surface of the cylindrical cores 60, 61, and 62 where they make a fit with respective cylindrical openings in the valve block 11. In actual practice when the cylindrical cores are made to fit the bores in the valve block with a sufficiently high degree of accuracy, no such ring seals are necessary to prevent fluid leakage. A reservoir 70 partially filled with hydraulic fluid necessary for the operation of the hydraulic control device is connected through duct 71 to the last path to be closed in the operation of the system. Pressure is applied to the fluid in the reservoir 70 through the main 72 thereby applying pressure above atmospheric to the incompressible fluid in the system. This pressure prevents air from being taken into the system during the operation of the hydraulic cylinder.

Figure 3:
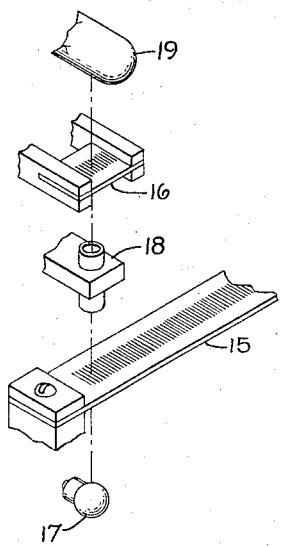
Fig. 3 is an expanded view in perspective of a portion of the motion sensing device of the apparatus of Fig. 1.

The sensing device or scanning head 12, a part of which is shown in greater detail in Fig. 3, comprises a light source 17, a lens system 18, a small bar 16 of transparent material and a photoresponsive device 19 spaced in the housing 13 in the order named. On the transparent bar 16 are located a series of opaque lines parallelwise disposed one with respect to the other. The width of each of the opaque lines is equal to the width of the transparent space between the adjacent edges of the opaque lines. These lines are spaced close together to form a fine grating. The transparent bar 15 is mounted on the table 2 and extends for substantially the length of travel of the work holder 3. The bar 15 is further positioned between the light source 17 and the lens system 18 through openings in the housing as shown. On the bar 15 are located fine opaque lines parallelwise disposed with respect to the opaque lines on bar 16. The width of each of the opaque lines on the bar 15 is made equal to the width of the transparent space between adjacent edges of the opaque lines. The width of the opaque lines on the long transparent bar 15 is of the order of magnitude of the least significant digit in the measurement of motion of the work holder 3. The width of the opaque lines on the small transparent bar 16 is equal to the width of the opaque lines on the bar 15 multiplied by the magnification factor of the lens system 18.

In operation, light from the lamp 17 passes through the first bar, is focussed by the lens system 18 on to the second bar 16 and then falls on the photoresponsive device 19. As the scanning head 12 moves along the long transparent bar 15 the action is not unlike that of shining light through a small Venetian blind, magnifying the image, and then causing the enlarged bars of light and shadow to fall upon a corresponding large Venetian blind. As the small blind is moved the magnified image shutters light on and off through the large blind at increments of distance equal to the on center spacing of the Venetian blind slats. With such an arrangement in the scanning head 12, it is possible to derive an electrical impulse for a motion between the scanning head and the table 2 equal to the distance between the edge of one opaque line and the corresponding edge of the next opaque line on the transparent bar 15. It has been found practical to use opaque lines having a width of one-thousandth of an inch; thus making it practical to sense minute increments of displacement with the sensing apparatus described.

The amplifier and shaper 20 to be described in detail in connection with Fig. 4 converts the output of the photoelectric device 19 into pulses of proper amplitude and shape. These pulses are applied to the predetermined counter 21 which will be described in greater detail below in connection with Figs. 5, 6, and 8.

The predetermined counter 21 develops voltages at terminals 73, 74 when a first predetermined number of pulses has been applied to the counter 21 and develops voltages at terminals 75, 76 when a second predetermined number of pulses has been applied to counter 21 and develops voltages at terminals 77, 78 when a third predetermined number of pulses has been applied to the counter 21 corresponding to different locations of the work holder 3 and workpiece 1.

Voltages appearing at terminals 73, 74 are applied to electron discharge device 79 to render it conductive and actuate relay 24. The actuation of relay 24 causes normally open contacts 23 to be closed, thereby actuating solenoid 66 to close valve 25. The closing of valve 25 causes the rate of fluid flow between ducts 9 and 10 to decrease, and hence to cause the work holder 3 to move slower. Likewise, voltages appearing at terminals 75, 76 are applied to electron discharge device 80 to cause normally open contacts 26 to close, thereby actuating solenoid 67 to close valve 28, and hence still further slow down the motion of the work holder 3. Similarly, voltages appearing at terminals 77, 78 are applied to electron discharge device 81 to cause normally open contacts 29 to close, thereby actuating solenoid 68 to close valve 31 and to bring the work holder 3 to a stop.

Electron discharge device 79 includes a cathode 82, a grid 83 and an anode 84. The cathode 82 is connected to ground. The anode 84 is connected through the solenoid of relay 24 to the positive terminal of source 85 of unidirectional energizing potential, the other terminal of which is connected to ground. The grid 83 is connected through resistance 86 to the negative terminal of a source 87 of bias potential, the positive terminal of which is connected to ground. Grid 83 is also connected through a resistance 88 and through resistance 89 to terminals 73 and 74, respectively. Grid 83 is further connected through contacts 98 of relay 27 and resistance 99 to the positive terminal of source 85. Electron discharge device 80 includes a cathode 90, a grid 91 and an anode 92. The cathode 90 is connected to ground. The grid 91 is connected through resistance 93 to the negative terminal of source 87. The grid 91 is also connected through resistance 94 and resistance 95 to terminals 75 and 76, respectively. Grid 97 is further connected through normally open contacts 96 and resistance 97 to the positive terminal of source 85. Anode 92 is connected through the solenoid of relay 27 to the positive terminal of source 85. Electron discharge device 81 includes a cathode 100, a grid 101 and an anode 102. The grid 101 is connected through resistance 102 to the negative terminal of source 87. Grid 101 is also connected through resistance 103 and resistance 104 to terminals 77 and 78, respectively.

One contact of normally open contacts 23 is connected to the positive terminal of source 85 and the other contact is connected over conductor 105 to one terminal of solenoid 66, the other terminal of which is connected to ground. One contact of normally open contacts 26 is connected to the positive terminal of source 85 and the other contact thereof is connected over conductor 106 to one terminal of solenoid 67, the other terminal of which is connected to ground. One contact of normally open contacts 29 is connected to the positive terminal of source 85 and the other contact thereof is connected over conductor 107 to one terminal of solenoid 68, the other terminal of which is connected to ground.

With respect to the operation of the circuit described in the preceding paragraphs, before pulses are applied to the predetermined counter 21 the potentials at the terminals 73, 74, and 75, 76, and 77, 78 are sufficiently low to render the electron discharge devices 79, 80 and 81 non-conductive. Thus contacts 23, 26 and 29 are open, and correspondingly the valves 25, 28 and 31 are open. After a first predetermined number of pulses has been applied to the predetermined counter 21 as explained above, terminals 73 and 74 rise in potential causing electron discharge device 79 to become conductive, thereby causing a closure of the contacts 23 and actuation of the valve 25 thereby causing the fluid flow through the valve assembly 11 to decrease as pointed out previously. After a certain additional number of pulses have been received by the predetermined counter 21 the electron discharge device 80 similarly is rendered conductive, thereby causing the contacts 26 to close and causing the valve 28 to be closed, and thus further slowing down the flow of fluid through the valve assembly 28. Along with the closing of contacts 26 the contacts 98 are closed connecting the grid 83 of electron discharge 79 to a source of positive potential and assuring that the device 79 is rendered conductive regardless of the potentials at terminals 73, 74. After a final group of pulses are received by the predetermined counter 21 the terminals 77, 78 rise in potential, thereby rendering the electron discharge device 81 conductive, and hence causing the contacts 29 and the valve 31 to close. Thus flow of fluid from duct 9 to duct 10 through valve assembly 11 is completely shut off and work holder 3 is caused to stop. With the actuation of relay 30 contacts 96 are closed and grid 91 of electron discharge device 80 is connected to the positive terminal of source 85. Thus electron discharge device 80 is rendered conductive and maintained conductive regardless of potentials appearing at terminals 75, 76.

Connected in parallel between solenoid 68 of the valve last to be closed and ground is another solenoid 32 including a pair of normally open contacts 108. When solenoid 68 is energized the solenoid 32 is actuated causing the contacts 108 to close thereby actuating the punch mechanism 33 over conductors 109 and 110.

The punch mechanism 33 is supplied with power for the actuation thereof over shaft 111 to one end of which is connected plate 112 of clutch 113. The other plate 114 of clutch 113 is connected to arm member 115 pivoted about axis 116 and having a pin 117 in the end thereof remote from the axis 116. The pin 117 engages with a horizontal slot 118 in the punch holder 34. The punch holder 34 includes an end to which is attached the punch 119 and a rod-like end 120 which engages the shorting bars of switches 35, 36a, 38, and 39 and successively permits these switches to close as the punch holder is caused to move downward in the guide 121.

The plates of clutch 113 are caused to engage by actuation of the solenoid 122. Solenoid 122 has one terminal connected to battery 123, the other terminal thereof being connected to the other terminal of the battery 123 through a normally open switch 124. The cam 125 which is mechanically connected to the clutch plate 114 includes an indentation 126 which engages with a catch 127 on one end of the latch 128. A large resistance 129 is connected in shunt with the terminals 130' of switch 124 for continuously providing current to the solenoid 122 and thereby providing plate 114 of clutch 113 in slipping engagement with the plate 112 of clutch 113 to maintain latch portion 128 in firm engagement with indentation 126. The other end of latch 128 is mechanically connected to an armature 130 of solenoid 131. One terminal of the solenoid 131 is connected to the one terminal of the battery 123 and the other terminal of the solenoid 131 is connected over conductor 109 to one contact of normally open contacts 108 of relay 32, the other contact of relay 32 being connected over conductor 110 to the other terminal of battery 123.

When relay 32 is actuated by an impulse closing the last valve 31 of the valve assembly 11, the solenoid 131 is energized and causes the armature 130 to be drawn into the coil 131 thereby causing the latch 128 to be disengaged from the cam. Simultaneously, switch 124 closes thereby causing firm engagement of the clutch plate 114 with the moving clutch plate 112 and the cam 125 being connected to clutch plate 114 makes a turn and is stopped against catch 127 which is released before execution of the turn by virtue of the fact that presetting of counter 21 by opening of contacts 36a by downward movement of arm 115 releases solenoid 32 and hence, solenoid 131. The punch holder member 34 being linked to the clutch member 114 through the slot 118 and pin 117 arrangement is thus caused to move downward to perform a punching operation on the workpiece 1 and then return to its up or starting position.

The solenoid 132 of valve 36, the contacts of switch 35 and the battery 133 are in circuit. Accordingly, upon the downward movement of the holder 34 the switch 35 is closed thereby actuating the valve 36. The valve 36 comprises a block having a cylindrical bore 134 therein. A duct 135 is provided between the cylindrical bore and the collet 37. An intake duct 136 and an exhaust duct 137 provide entry to the bore 134. An axial slot 140 is also provided opening to duct 135 and axially encompassing the intake duct 136 and exhaust duct 137.

In the bore 134 is located a cylinder 138 having a peripheral groove 139 on the surface thereof. The cylinder 138 is spring biased in a position such that the groove 139 registers with the exhaust duct 137 and slot 140. Upon actuation of the solenoid the cylinder 138 moves inward and the groove registers with the intake duct 136 and with the slot 140 thereby permitting air to flow through the duct to the air collet to clamp the shaft 41 in position.

The air collet 37 comprises a cylindrical housing 141 in which is contained a movable piston member 142. The duct 135 of the air valve 36 is connected to one end of the opening in the cylinder 141. The piston member 142 includes a stem portion 143 which surrounds a collar member 144. The collar member 144 is essentially a cylinder having a portion 145 at the end remote from the piston inclined outward from the axis of the shaft 141. The collar member 144 includes slots in the side thereof. Thus, as air flows under pressure into the cylinder 141, the piston member 142 is caused to move along the shaft 41, thereby causing the stem portion 143 of the piston member 142 to exert inward pressure on the inclined portions 145 of the collar member 144 to force the latter to grip the shaft, and hence maintain the shaft in an immovable position. Ring members 146 function to prevent escapage of air along the shaft 41.

As the punch holder 34 continues its downward movement the switch 36a which presets the counter 21 is actuated. The switch 38 which advances the reader device 22 over conductors 147 and 148 is then actuated.

The reader device 22 comprises a transparent cylinder 149 about which is placed an opaque card 150 having a predetermined number of peripheral positions at which holes may be located. A light source 151 is directed through prisms 179 and 177 onto one side of the card 150 and a photoelectric responsive device 152, a photo transistor, for example, is located on the opposite side of the card 150 to receive light where it passes through the holes in card 150. Thus, as the cylinder 149 is caused to move by the motor 153 mechanically connected to the cylinder 149 through the belt and pulley arrangement 154, impulses are developed by the device 152 when a hole in the card passes between the source 151 and the device 152. The cylinder 149 is also connected through the shaft 155 to an insulated disk 156 having a conductive ring 157 on the periphery thereof. A brush 158 bears on the conductive ring. On the disk 156 is also located a brush member 159 conductively connected to the ring 157 through plate 156'. Thus as the ring is caused to rotate, continuous conductive connection is made from the brush 158 to the brush 159.

A commutator member 160 consisting of an insulating block portion on which are located conductive contacts 161 is located adjacent to the disk member 156 in such a manner that as the transparent drum 149 and the disk 156 move, the brush 159 makes contact with the commutator segments 161, each segment corresponding to respective peripheral positions of the cylinder 149. Each one of the commutator segments 161 is connected over cable 162 to a particular point in the predetermined counter 21. Thus for each peripheral position of the cylinder 149, there exists a connection from the brush 158 to respective ones of the conductors 162 connected to the predetermined counter 21.

In constant engagement with the transparent drum 149 is a rubber wheel 163 which is connected by means of hollow shaft 164 to plate 165 of clutch 185. The other plate of clutch 185 is connected to one end of a screw 169, the other end of which is in turn connected to the spur gear 170. Connection is made from the spur gear 170 through the idler gear 171 to another spur gear 172 located at one end of the screw 173 concentrically positioned within the hollow cylinder 149 and free to move independent of the cylinder 149. A carriage 174 on which is included the aforementioned photoelectric device 152, is located in threaded engagement on the screw 169 and restrained to axial movement along the screw 169 by the guide member 175. Accordingly, as the screw 169 is caused to turn, the carriage 174 is caused to move along the screw 169 in an axial direction. Another carriage 176 including a prism 177 is located in threaded engagement on the screw 173 and restrained to axial movement along this screw by the guide member 178. Another prism 179 having a reflective surface disposed with respect to the reflective surface of the first-mentioned prism 177 and the light source 151 such that light is reflected from the light source 151 to the prism 179 and thence through the card 159 to the photoresponsive device 152. The photoresponsive device 152 has one terminal connected to a source of positive potential 180, the negative terminal of which is connected to ground, and has the other terminal connected through a pair of normally open contacts 181 of relay 182 to the input of amplifier and pulse shaper 183, the output of which is connected over conductor 184 to the brush 158. The amplifier and pulse shaper 183, preferably comprise a circuit of the kind shown in Fig. 4. The relay 182 is connected in circuit with the switch 39 and battery 133. Accordingly, it is seen that when the holder 34 moves downward the switch 39 is closed and relay 182 is actuated to close contacts 181. Thus, with photoresponsive device 174 stationary and the drum 149 rotating pulses are generated in the photoresponsive device 174 at those times when a hole passes between the photoresponsive device and the prism 177. These pulses are supplied through the commutator 160 to appropriate points in the predetermined counter 21 in a manner to preset the counter to a predetermined count and are also supplied to the device 40, which will be described in greater detail in connection with Fig. 9, to direct the two-way valve 47 connected to the air cylinder 6 to cause the piston 5 to move in the proper direction.

The photoresponsive device 152 and the prism 177 are advanced in peripheral position along the screw 169 to provide another set of presetting pulses to the predetermined counter by the one-turn clutch assembly 166. As mentioned above one plate 165 of clutch 185 is connected to the wheel 163 through a hollow shaft 164 and is normally rotating since the wheel 163 is in constant engagement with the drum 149. The other plate 167 of clutch 185 is mechanically connected to the cam 168 and the screw 169 and engages with plate 165 by actuation of solenoid 186. Solenoid 186 has one terminal connected to battery 187, the other terminal thereof being connected to the other terminal of the battery 187 through a normally open switch 188. The cam 168 includes an indentation 189 which engages with a catch 190 on one end of the latch 191. A large resistance 192 is connected in shunt with the contacts of switch 188 for continuously providing current to the solenoid 186 and thereby providing slipping engagement of plate 167 with the plate 165 of clutch 185 to maintain latch 191 securely against indentation 189. The other end of latch 191 is mechanically connected to an armature 192 of a solenoid 193. One terminal of the solenoid 193 is connected to one terminal of the battery 187 and the other terminal of the solenoid 193 is connected to one terminal of the impulse device 193a, the other output terminal of which is connected to the other terminal of the solenoid and the other terminal of the battery 187. Connected to the input terminals of the impulse device 193a are the contacts of a normally open switch 38 associated with the punch press. The impulse device 193a functions to develop a momentary impulse upon the closing of contacts of switch 38 thereby to actuate the solenoid 193 momentarily to unlatch the latch 190 and permit the execution of only one turn by the cam 168. The device 193a, for example, could be a motor to which is coupled a switch operative at a predetermined peripheral position of the rotor of the motor to actuate solenoid 193. Excitation of the motor by closing of switch 38 would cause momentary actuation of solenoid 193. Removal of excitation from the motor would have no effect on solenoid 193 through switch 38 associated with the punch press to the other terminal of the battery. When the switch 38 is closed, the solenoid 193 is actuated causing the armature 192' to be drawn into the solenoid 193, thereby causing the latch 191 to be disengaged from the cam 168. Simultaneously, the switch 188 closes thereby causing firm engagement of the clutch plate 167 with the moving clutch plate 165 to cause the cam 168 to make one turn and be stopped against catch 190. The screw 169, being connected to the plate 167, also makes one turn and advances the reflector 177 and the photoresponsive device 152 to the next axial location where it may scan another group of holes in the card 150.

Referring now to Fig. 4, there is shown in detail the circuit of block 20 of Fig. 1 for amplification and shaping of the pulses obtained from the photoelectric responsive device 19 before application of these pulses to the predetermined counter 21. For the predetermined counter to operate satisfactorily, it is necessary that the pulses applied to the counter 21 be of the proper shape and amplitude. This circuit includes an amplifier portion 194 and a pulse shaping portion 195. The amplifier portion 194 comprises a pair of electron discharge devices 196 and 197. The electron discharge device 196 includes a cathode 198, a grid 199 and an anode 200. Electron discharge device 197 includes a cathode 201, a grid 202 and an anode 203. The cathodes 198 and 201 are connected together and through resistances 204 and 205 to the negative terminal 206a of a source of unidirectional potential 206. The anode 200 is connected through a load resistance 207 to ground and to the positive terminal 206b of source 206. The grid 199 is connected to terminal 208. Voltage divider 111 is connected in shunt across the source 206. The movable tap on voltage divider 111 is connected to terminal 209. Terminals 208 and 209 are connected to the photoresponsive device 19. The grid 202 is connected to the junction of resistances 204 and 205. The anode 203 is connected to ground. Thus variations in potential between terminals 208 and 209 appear in amplified form between the anode 200 and the negative terminal 206a. Electron discharge device 197 functions as a stabilizer for the D.-C. amplifier 196, principally to compensate for the effect of variations in emission from the cathodes 198 and 201.

The voltage variations appearing between anode 200 and the terminal 206a are applied to the shaper circuit 195. This circuit comprises electron discharge devices 210 and 211. The electron discharge device 210 includes a cathode 212, a grid 213 and an anode 214. Electron discharge device 211 includes a cathode 215, a grid 216 and an anode 217. The cathodes 212 and 215 are connected together and through resistance 218 to the negative terminal 206a. The grid 213 is connected to anode 200. The anode 214 is connected through anode load resistance 219 to the positive terminal of a source 220 of unidirectional potential, the negative terminal of which is connected to terminal 206b. The anode 214 is also connected through a parallel combination of resistance 221 and capacitance 222 to the grid 216. The grid 216 is also connected through grid leak resistance 223 to terminal 206a. The anode 217 is connected through anode load resistance 24 to the positive terminal of source 220 and is also connected to output terminal 225. The pulse shaping circuit described functions as a heavily biased relaxation oscillator having two stable states of the conduction, depending upon the potential applied to the grid 213. Normally, the electron discharge device 211 is conducting due to the fact that the grid 216 thereof is biased by resistances 219, 221, and 223 to a positive potential with respect to the cathode 215, and the electron discharge device 210 is non-conducting since the bias developed across resistance 218 maintains the cathode 212 positive with respect to the grid 213 which is connected to a point sufficiently negative to render this device non-conductive. As the potential appearing at the grid 213 is increased to one predetermined potential, the electron discharge device 210 is rendered conductive and accordingly dropping the potential of the anode 214 which in turn drops the potential of grid 216 to render the device 211 non-conductive. Normally device 211 would remain non-conductive until the charge on capacitance 222 decayed to a value sufficient to raise the potential at grid 216. However, grid 213, in the meantime, is dropped in potential to another predetermined potential, whereupon the device 213 is rendered non-conductive and device 211 is rendered conductive. Accordingly, it is seen that variations in potential between the grid 213 and the negative terminal 206a below one predetermined potential and above another predetermined potential cause the appearance of pulses between the output terminals 225 and 206a. These pulses have steep wave fronts, a large amplitude and a duration corresponding to the time displacement of said predetermined potentials.

Referring now to Fig. 5, there is shown a circuit arrangement forming the basic counting unit of the predetermined counter 21. This circuit comprises a first electron discharge device 226 having a cathode 227, a grid 228, and an anode 229 and a second electron discharge device 230 having a cathode 231, a grid 232 and an anode 233. The cathodes 227 and 231 are connected to one end of cathode bias resistor 234, the other end of which is connected to terminal $b$. Resistor 234 is by-passed by capacitor 234a. Grid 228 is connected through grid resistance 229 to terminal $b$. Grid 228 is also connected through a parallel combination of resistance 230a and capacitance 231 to anode 233. The anode 229 is connected through anode load resistance 235 to the terminal $c$. Anode 229 is also connected through a coupling resistance 236 and through coupling capacitor 237 to pulse input terminal $a$. The anode 229 is further connected to input terminal $g$. The grid 232 is connected through grid resistance 238 to terminal $f$. Grid 232 is also connected through a parallel combination of resistance 239 and capacitance 240 to anode 229. The anode 233 is connected through anode resistance 241 to the terminal $c$. Anode 233 is also connected through a coupling resistance 242 to the junction of resistance 236 and capacitance 237. Anode 233 is further connected to terminal $d$. To render the circuit of Fig. 5 operative the positive terminal of a source of unidirectional potential is connected to terminal $c$ the negative terminal of this source is connected to terminal $b$, and terminal $f$ is connected to terminal $b$.

The circuit described in the preceding paragraph is referred to in the art as a heavily biased relaxation oscillator with two stable conditions of operation; that is, the current flowing through one of the above-referred devices changes abruptly from one value to a second value when the circuit combination is suitably triggered or actuated by a negative pulse applied at input terminal $a$.

With regard to the maner of operation of the above circuit combination, assume that device 230 is conducting. A negative trigger impulse applied at terminal $a$ is coupled to grid 232 through resistance 239 and capacitance 240 and lowers the potential of this grid. The lowering of potential of grid 232 causes a decrease in conduction of device 230, thereby causing the potential of anode 233 to rise. The negative pulse applied to terminal $a$ has no affect on device 226, since grid 228 of this device is already biased negatively by the voltage drop across cathode resistance 234. The rise in potential at the anode 233 is applied to the grid 228 through the parallel combination of resistance 230a and capacitance 231 causing the device 226 to start conducting. Current conduction through device 226 causes a lowering of the potential at the anode 229. A reduction of potential at the anode 229 causes grid 232 to further drop in potential to decrease further conduction in device 230. This positive feedback action causes the device 230 to become non-conductive and the device 226 to become conductive in an extremely rapid time. If now another negative trigger impulse is applied to terminal $a$, the reverse action would take place, leaving device 226 non-conductive and device 230 conductive.

It is apparent from the above explanation that when device 230 is conducting and device 226 is non-conducting, a negative pulse applied at terminal $g$ will cause device 230 to become non-conducting and device 226 to become conducting. Similarly, when device 226 is conducting and device 230 is non-conducting, a negative impulse applied at terminal $d$ will cause device 226 to become non-conducting and device 230 to become conducting.

Referring now to Fig. 6, there is shown a decade counting circuit which develops a pulse at output terminals 243 and 244 for every ten pulses applied at input terminals 245 and 246. This circuit comprises four units 247, 248, 249 and 250, each of which comprises a combination of elements identical to the combination disclosed in Fig. 5. The units 247, 248, 249, and 250 are interconnected in such a manner that at the zero count state of the decade circuit of Fig. 6, the terminal $d$ of each of the units 247, 248, 249, 250 is down, i.e., at the lower of its two potential conditions as shown in the table of Fig. 7. This table shows the potential condition of terminal $d$ of each of the units 247, 248, 249 and 250 after pulses from one to nine have been applied to the decade circuit. From the table it is seen that the application of one pulse to the decade circuit produces a condition in which the potential of terminal $d$ of unit 247 is Up and the potential of terminal $d$ of the other units is Down. The application of two pulses produces a condition in which the potential of terminal $d$ of unit 248 is Up and the potential of terminal $d$ of the other units is Down. The application of three pulses produces a condition in which the potential of terminal $d$ of units 247 and 248 is Up and the potential of terminal $d$ of the other units is Down. Thus, it is seen that unit 247 has a weight of one, unit 248 has a weight of two, unit 249 has a weight of four and unit 250 has a weight of five. To obtain the count stored in a decade it is simply necessary to add together the weights of those units with terminal $d$ Up in potential.

Referring now to Fig. 6 in greater detail, where the literal designations on the units 247, 248, 249 and 250 correspond to the literal designations in the circuit of Fig. 5, there is shown a source of unidirectional potential 251 having a positive terminal 251a and a negative terminal 251b connected to ground. The positive terminal 251a is connected to terminal $c$ of each of the devices 247, 248, 249 and 250. The negative terminal 251b is connected to terminal $b$ of each of the devices 247, 248, 249 and 250. Connected in series between terminal 251a and 251b are resistances 252 and 253. Likewise, resistances 254 and 255 are connected in series between terminals 251a and 251b. Terminal $d$ of unit 249 is connected to the anode of the unilaterally conducting device 257, the cathode of which is connected to the junction of resistances 254 and 255. The potential at the junction of resistances 254 and 255 being appreciably higher than the potential at terminal $d$ of the unit 249 the unilaterally conducting device normally is non-conductive. Terminal $d$ of unit 249 is also connected through a resistance 256 to the cathode of unilaterally conducting device 258. The cathode of unilaterally conducting device 258 is also connected through coupling capacitor 259 to the terminal 245. The anode of unilaterally conducting device 258 is connected to the junction of resistances 252 and 253 and to one electrode of coupling capacitor 260 the other electrode of which is connected to the cathodes of unilaterally conducting devices 261 and 262. The anode of unilaterally conducting device 261 is connected to terminal $d$ of unit 247 and is also connected to terminal $a$ of unit 248. The anode of unilaterally conducting device 262 is connected to terminal $g$ of unit 247. Terminal 246 is connected to ground.

When a negative pulse of sufficient amplitude is applied between terminals 245 and 246 unilaterally conducting device 258 conducts and a pulse appears at the junction of resistances 252 and 253. This pulse is coupled through capacitor 260 and through unilaterally conducting device 262 to terminal $g$ of unit 247 to drop the potential of terminal $g$ and raise the potential of terminal $d$. Since terminal $d$ of device 247 was down in potential, the negative pulse applied to it through unilaterally conducting device 261 had no effect. The second negative pulse applied at terminals 245, 246 causes terminal $g$ of device 247 to rise in potential and causes terminal $d$ of unit 247 to drop in potential. The drop in potential of terminal $d$ is applied to terminal $a$ of unit 248 and causes terminal $d$ of unit 248 to rise in potential and terminal $g$ to drop in potential. The application of a third pulse to the decade counting circuit causes unit 247 to change its state of conduction. Unit 248 does not change its state of conduction since terminal $a$ of this unit is responsive to only negative pulses. Upon the application of a fourth negative pulse to the decade circuit terminal $d$ of unit 248 drops in potential. This drop in potential is applied to terminal $e$ of unit 249 through coupling capacitor 263 to cause terminal $d$ of unit 249 to rise in potential. The rise in potential of terminal $d$ of unit 249 is applied to the cathode of unilaterally conducting device 258 and to the anode of unilaterally conducting device 257 to bias the device 258 non-conductive and to bias the device 257 conductive to negative pulses applied between terminals 245 and 246.

The fifth pulse applied at terminals 245, 246 is thus blocked by unilaterally conducting device 258 and is coupled through coupling capacitor 264 and unilaterally conducting device 257 to terminal $d$ of unit 249 to drop the potential of this terminal. By this action, the unilaterally conducting device 258 is unblocked and the unilaterally conducting device 257 is again blocked. The drop in potential of terminal $d$ is applied through unilaterally conducting device 265 to terminal $a$ of unit 250 to raise the potential of terminal $d$ of this unit.

The application of five more pulses to the decade circuit causes the units 247, 248, 249, and 250 to go through a sequence of operation identical to the sequence of operation upon application of the first five pulses except that on the tenth pulse the terminal $d$ of unit 250 is caused to drop in potential. Thus a pulse is obtained at output terminals 243, 244 for every ten pulses applied at input terminals 245, 246.

The decade of Fig. 6 may be preset in a manner that upon the application of less than ten pulses at terminals 245, 246 a pulse is obtained at output terminals 243, 244. This is done by supplying pulses over the conductors 247a, 248a, 249a, or 250a to one or more of the units 247, 248, 249, or 250 to advance the sequence of operation of these units such that any smaller number than ten pulses need be supplied to the counter to cause an impulse to be developed between terminals 243, 244. For example, the application of a negative pulse over conductor 247a causes terminal $d$ of unit 247 to rise in potential, hence, the application of only nine pulses at the input terminals 245, 246 will cause a pulse to be developed at output terminals 243, 244. Also, the application of a negative pulse over conductor 248a causes terminal $d$ of unit 248 to rise in potential; hence, the application of only eight pulses at input terminals 245, 246 will cause a pulse to be developed at outer terminals 243, 244.

The conductor 273 is connected to terminal $f$ of the units 247, 248, 249, and 250 which in turn is connected through a normally closed switch (switch 36a of Fig. 1) to ground. To set the decade to zero count the switch 36a is opened.

Electron discharge device 266 having a cathode 267, a grid 268, and an anode 269 functions as a cathode follower to maintain proper bias on device 265 to prevent spurious pulses from being applied from unit 249 to unit 250. The cathode is connected to ground through resistance 270 and is also connected to the positive terminal of unilaterally conducting device 265. The grid is connected to the junction of resistances 271 and 272 which are connected in series across the source of unidirectional potential. The anode 269 is connected to the positive terminal of source 251.

Figure 8:
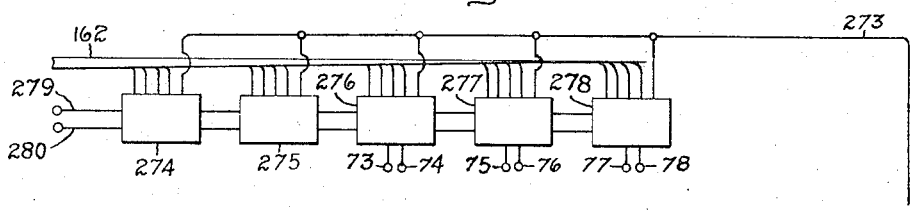
Fig. 8 is a block diagram of the predetermined counter of the apparatus of Fig. 1.

Referring now to Fig. 8, there is shown the predetermined counter 21 of Fig. 1 in greater detail. The counter 21 comprises five decades 274, 275, 276, 277, and 278, each like the decade shown in Fig. 6, and connected in cascade. The conductors 279 and 280 are the input conductors to the predetermined counter. The counter 21 being composed of five decades is capable of counting up to one hundred thousand input pulses. The cable 162 comprises four conductors corresponding to conductors 247a, 248a, 249a, and 250a of Fig. 6 from each of the decades 274, 275, 276, 277, and 278. Cable 162 is connected to the reader device 22 from which pulses are obtained to preset the counter 21 as explained in connection with Fig. 1. The conductor 273 is connected to each of the decades and corresponds to conductor 273 of Fig. 6.

Terminals 73, 74 are connected to the points in decade 276 which rise in potential when a first predetermined number of pulses has been applied to the counter 21 as explained in connection with Fig. 1. Similarly, terminals 75, 76 represent points in decade 277 which rise in potential when a second predetermined number of pulses has been applied to the counter 21, and terminals 77, 78 represent points in decade 278 which rise in potential when a third predetermined number of pulses has been applied to the counter 21.

Figure 9:
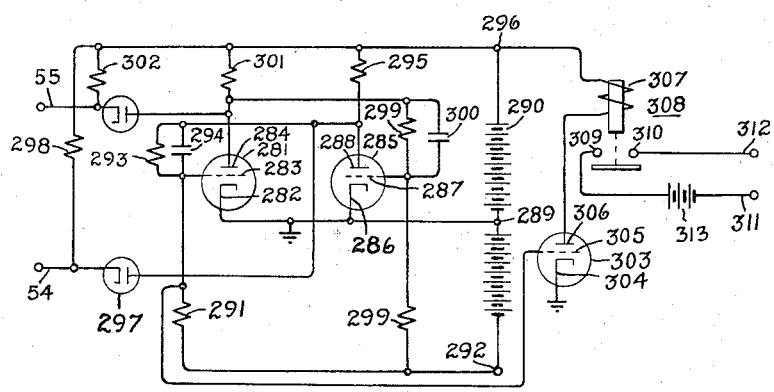
Fig. 9 is a schematic diagram of the selective switching circuit utilized in the apparatus of Fig. 1.

Referring now to Fig. 9, there is shown in detail the circuit represented by block 40 of Fig. 1. This circuit comprises a first electron discharge device 281 having a cathode 282, a grid 283, and an anode 284, and a second electron discharge device 285 having a cathode 286, a grid 287, and an anode 288. Cathodes 282 and 287 are connected to ground and to an intermediate potential point 289 on a source 290 of unidirectional potential. Grid 283 is connected through grid resistance 291 to the negative terminal 292 of source 290. Grid 283 is also connected through a parallel combination of resistance 293 and capacitance 294 to anode 288. The anode 288 is connected through anode load resistance 295 to the positive terminal 296 of the source 290. Anode 288 is also connected to the anode of unilaterally conducting device 297, the cathode of which is connected to the conductor 54. The conductor 54 is connected through resistance 298 to the positive terminal 296. The grid 287 is connected through grid resistance 299 to the negative terminal 292. The grid 287 is also connected through a parallel combination of resistance 299 and capacitance 300 to anode 284. The anode 284 is connected through anode load resistance 301 to the positive terminal 296. Anode 284 is also connected to the anode of unilaterally conducting device 302, the cathode of which is connected to the conductor 55. The conductor 55 is connected through resistance 302 to the positive terminal 296.

With regard to the manner of operation of the above circuit combination, assume that the device 285 is conducting, and device 281 is non-conducting. A negative trigger pulse applied at conductor 55 is coupled to the grid 287 through the parallel combination of resistance 299 and capacitance 300 and lowers the potential of this grid. The lowering of potential of grid 287 causes a reduction in conduction of device 285, thereby causing the anode potential of this device to rise. Rise in potential of the anode 288 is applied to the grid 283 through the parallel combination of the resistance 293 and capacitance 294, causing the device 281 to start conducting. Current conduction through device 281 causes a further drop in the potential at anode 284. The drop in potential at anode 284 causes grid 287 to further drop in potential, thereby further reducing conduction in device 285. This positive feedback action causes the device 285 to become non-conductive and the device 281 to become conductive in an extremely rapid time. If now a negative trigger impulse is applied to conductor 54 the reverse action would take place leaving the device 281 non-conductive and device 285 conductive.

The changes in potential across grid resistance 291 are applied to electron discharge device 303 which includes a cathode 304, a grid 305 and an anode 306. The grid 305 is connected to grid 283. The cathode 304 is connected to ground. The anode 306 is connected through the solenoid 307 of relay 308 to the positive terminal 296. The normally open contacts 309 and 310 of relay 308 are connected to conductors 311 and 312 respectively, which in turn are connected in circuit with a source of operating potential 313 to the solenoid 52 of Fig. 1. Thus the contacts 309 and 310 are opened or closed depending on the bias applied to the grid 305 which in turn dependent upon whether device 281 or device 285 is conducting.

While means for positioning an object in a single direction has been shown and described, it is to be understood that the system described may be duplicated for other directions of motion to permit positioning of an object in a predetermined location in space.

While the air collet clamping arrangement 37 has been utilized to clamp the work holder 3 in place after the work holder has been stopped by valve assembly 11, the air collet 37 may also be utilized when properly connected in circuit to stop the work holder 3 after it has been slowed down by the valve assembly 11. The air collet arrangement such as shown and described may also function as a means for slowing down as well as for stopping the motion of objects.

While I have shown a particular embodiment of my invention, it will, of course, be understood that I do not wish to be limited thereto since many modifications, both in the circuit arrangement and in the instrumentalities employed, may be made, and I, therefore, contemplate by the appended claims to cover any such modifications as fall within the true spirit and scope of my invention.

What I claim as new and desire to secure by Letters Patent of the United States is:

1. Apparatus for controlling the movement of an object comprising means for moving said object, means for sensing by finite increments of displacement the movement of said object, container means including a substantially incompressible fluid and formed in a manner that said fluid completely fills and is adapted to move in a confined path, means for linking said fluid with said first means in a manner that the movement of said first means is controlled by the movement of said fluid in said path, means connected to said sensing means and responsive to predetermined numbers of said increments of displacement of said object for progressively restraining the movement of said fluid in said path, whereby the movement of said object is controlled.

2. Apparatus for controlling the movement of an object comprising means for moving said object, container means including a substantially incompressible fluid and formed in a manner that said fluid completely fills and is adapted to move in a confined path, means for linking said fluid with said first means in a manner that the movement of said first means is controlled by the movement of said fluid in said path, means for sensing the movement of said object, means repetitively responsive to said sensing means for progressively controlling the movement of said fluid in said path, whereby the movement of said object is controlled.

3. Apparatus for controlling the movement of an object comprising means for moving said object, a loop-shaped tubular member completely filled with a substantially incompressible fluid, a piston located within said tubular member and providing a complete barrier to the movement of fluid within said tubular member, said piston being linked to said means and being movable in said member in accordance with the movement of said object, means responsive to the position of said object for repetitively progressively restricting the flow of fluid in said tubular member, and means for stopping the flow of fluid in said tubular member thereby controlling the rate of movement and the movement of said object.

4. Apparatus for controlling the movement of an object comprising means for moving said object, a loop-shaped tubular member completely filled with a substantially incompressible fluid, a piston located within said tubular member and providing a complete barrier to the movement of fluid within said tubular member, said piston being linked to said means and being movable in said member in accordance with the movement of said object, a plurality of valves situated along said member for repetitively progressively restricting and completely stopping the flow of fluid in said member, means responsive to the position of said object for individually actuating said valves to control the movement of said fluid in said tubular member, thereby controlling the rate of movement and the movement of said object.

5. Apparatus for controlling the movement of an object comprising means for moving said object, a loop-shaped tubular member completely filled with a substantially incompressible fluid, a piston located within said tubular member and providing a complete barrier to the movement of fluid within said tubular member, said piston being linked to said means and being movable in said member in accordance with the movement of said object, a portion of said tubular member being formed into a plurality of parallel paths, means for individually blocking the passage of said fluid through said paths means responsive to the position of said object for sequentially actuating said blocking means to control the rate of movement and the movement of said object.

6. Movement sensing apparatus comprising a movable member, a stationary transparent member extending in the direction of movement of said first member and having opaque lines thereon separated by transparent spaces of the same width as said lines, another transparent member attached to said movable member and having opaque lines thereon separated by transparent spaces of the same width as said lines thereof, the lines of said third member extending generally parallelwise with respect to the lines on said second member, means for directing light through one of said transparent members toward the other of said transparent members, means for projecting a portion of the image of said transparent member onto said other transparent member, the width of the opaque lines on said one transparent member being proportioned with respect to width of the opaque lines on said other transparent member such that the width of the projected opaque lines of one of said one member is equal to the width of the opaque lines of said other member, whereby as said first mentioned member moves periodic variations in light intensity appear on the side of said other member opposite from said projecting means, the number of said periodic variations in light intensity representing the displacement of one of said members with respect to the other of said members and the rate of said periodic variations in light intensity representing the rate of displacement of said members, and means to operate in response to said periodic variations in light intensity, said last named means comprising counting means for counting said periodic variations.

7. Apparatus for controlling the movement of an object comprising means for moving said object, container means including a substantially incompressible fluid and formed in a manner that said fluid completely fills and is adapted to move in a confined path, means for linking said fluid with said first means in a manner that the movement of said first means is controlled by the movement of said fluid in said path, pulse counting means arranged to develop an impulse for a predetermined number of pulses applied thereto, means for deriving a pulse for each increment of movement of said object and for applying said pulses to said pulse counting means, means responsive to said impulse for repetitively progressively controlling the movement of said fluid in said path, whereby the movement of said object is controlled.

8. Apparatus for positioning an object from one location to another location comprising means for moving said object, means for sensing by finite increments of displacement the movement of said object, container means including a substantially incompressible fluid and formed in a manner that said fluid completely fills and is adapted to move in a confined path, means for linking said fluid with said first means in a manner that said moving means is controlled by the movement of said fluid in said path, pneumatic clamping means for stopping the movement of said object, means connected to said sensing means responsive to a predetermined number of said increments of displacement of said object for restraining the movement of said fluid in said path to restrain the movement of said object and responsive to another predetermined number of said increments of displacement of said object for actuating said clamping means, the sum of said predetermined number of said increment being equal to the displacement of said one location from said other location, whereby said object is positioned from said one location to said other location.

9. Apparatus for positioning an object from one location to another location comprising means for moving said object, means for sensing by finite increments of displacement the movement of said object, container means including a substantially incompressible fluid and formed in a manner that said fluid completely fills and is adapted to move in a confined path, means for linking said fluid with said first means in a manner that said moving means is controlled by the movement of said fluid in said path, pneumatic clamping means for maintaining said object stationary, means connected to said sensing means responsive to a predetermined number of said increments of displacement of said object for stopping the movement of said fluid in said path thereby stopping the movement of said object and for actuating said clamping means after said object has stopped, whereby said object is positioned from said one location to said other location.

10. Apparatus for controlling the movement of an object comprising means for moving said object, means for sensing by finite increments in displacement the movement of said object, container means including a substantially incompressible fluid and formed in a manner so that said fluid completely fills and is adapted to move in a confined path, means for linking said fluid with said first means so that the movement of said first means is controlled by the movement of said fluid in said path, a pair of valves disposed in parallel relationship with respect to one another in said path for restraining the movement of fluid in said path, each of said valves being responsive to a respective predetermined number of said increments to stop the flow of said fluid therethrough thereby restraining the movement of said fluid in said path in a predetermined manner and means responsive to another predetermined number of said increments for stopping the movement of said object, whereby the movement of said object is controlled.

References Cited in the file of this patent

UNITED STATES PATENTS

| | | |
|---|---|---|
| 725,456 | Lemp | Apr. 14, 1903 |
| 1,155,552 | Cuenot et al. | Oct. 5, 1915 |
| 1,349,995 | Wurts et al. | Aug. 17, 1920 |
| 1,551,372 | Crocker | Aug. 25, 1925 |
| 1,772,186 | Lee et al. | Aug. 5, 1930 |
| 1,849,642 | Schenker | Mar. 15, 1932 |
| 1,998,873 | Kingsbury | Apr. 23, 1935 |
| 2,326,498 | Rodal | Aug. 10, 1943 |
| 2,375,665 | Koulicovitch | May 8, 1945 |
| 2,406,299 | Koulicovitch | Aug. 20, 1946 |
| 2,562,591 | Wagner et al. | July 31, 1951 |
| 2,537,427 | Seid et al. | Jan. 9, 1951 |
| 2,672,067 | Hansell | Mar. 16, 1954 |
| 2,710,934 | Senn | June 14, 1955 |